(12) United States Patent
Wakinaka et al.

(10) Patent No.: US 10,529,499 B2
(45) Date of Patent: *Jan. 7, 2020

(54) ELECTRICITY STORAGE UNIT

(71) Applicant: Panasonic Intellectual Property Management Co., Ltd., Osaka (JP)

(72) Inventors: Kiyoshi Wakinaka, Osaka (JP); Yohsuke Mitani, Osaka (JP); Kazuki Morita, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/224,436

(22) Filed: Dec. 18, 2018

(65) Prior Publication Data

US 2019/0139712 A1 May 9, 2019

Related U.S. Application Data

(63) Continuation of application No. 15/622,306, filed on Jun. 14, 2017, now Pat. No. 10,192,691, which is a
(Continued)

(30) Foreign Application Priority Data

Jan. 8, 2015 (JP) ................................ 2015-002002

(51) Int. Cl.
*H02G 3/08* (2006.01)
*H01G 11/78* (2013.01)
(Continued)

(52) U.S. Cl.
CPC .............. *H01G 11/82* (2013.01); *H01G 2/10* (2013.01); *H01G 11/10* (2013.01); *H01G 11/74* (2013.01);
(Continued)

(58) Field of Classification Search
CPC .......... H02G 3/08; H02G 3/081; H01G 11/10; H01G 2/10; H01G 11/78; H01G 11/82;
(Continued)

(56) References Cited

U.S. PATENT DOCUMENTS 4,585,122 A 4/1986 Stegenga
5,162,980 A 11/1992 Morgan et al.
(Continued)

FOREIGN PATENT DOCUMENTS

JP 59-57863 U 4/1984
JP 2007-110035 A 4/2007
(Continued)

OTHER PUBLICATIONS

International Search Report of PCT Application No. PCT/JP2015/005494 dated Jan. 19, 2016.

*Primary Examiner* — Angel R Estrada
(74) *Attorney, Agent, or Firm* — McDermott Will & Emery LLP

(57) ABSTRACT

An electricity storage unit of the present disclosure includes: an electricity storage device; a holder for holding this electricity storage device; a case having a tubular side wall part and a bottom surface part closing one end of the side wall part, the case being formed with an opening at another end of the side wall part; and a cover for covering the opening. The electricity storage device and the holder are housed inside the case. At least a part of the cover is inserted inside the case. An aperture is formed at least part of a region between an outer periphery of the cover and an inner surface of the side wall part.

20 Claims, 10 Drawing Sheets

Related U.S. Application Data continuation of application No. PCT/JP2015/005494, filed on Nov. 2, 2015.

(51) Int. Cl.
    *H01G 11/82*     (2013.01)
    *H01G 11/10*     (2013.01)
    *H01G 2/10*     (2006.01)
    *H01G 11/74*     (2013.01)
    *H01M 2/10*     (2006.01)
    *H01M 2/20*     (2006.01)

(52) U.S. Cl.
    CPC ............. *H01G 11/78* (2013.01); *H01M 2/105* (2013.01); *H01M 2/202* (2013.01)

(58) Field of Classification Search
    CPC ......... H01G 11/00; H01G 11/74; H01M 2/10; H01M 2/1016
    USPC .......... 174/50, 520, 17 R, 535, 559; 220/3.2, 220/3.3, 4.02; 361/600, 601, 641, 679.01, 361/731, 796, 502, 500, 517, 535; 439/76.1, 76.2

See application file for complete search history.

(56) References Cited

U.S. PATENT DOCUMENTS

| | | | |
|---|---|---|---|
| 6,856,517 | B2 | 2/2005 | Keating et al. |
| 8,064,191 | B2 | 11/2011 | Morita et al. |
| 10,192,691 | B2 * | 1/2019 | Wakinaka .............. H01G 11/10 |
| 2009/0059470 | A1 | 3/2009 | Morita et al. |
| 2013/0105210 | A1 | 5/2013 | Morita et al. |
| 2014/0045006 | A1 | 2/2014 | Yoon et al. |

FOREIGN PATENT DOCUMENTS

| | | |
|---|---|---|
| JP | 2007-250830 A | 9/2007 |
| JP | 2009-253009 A | 10/2009 |
| JP | 2013-098206 A | 5/2013 |
| JP | 2014-038840 A | 2/2014 |

\* cited by examiner

ELECTRICITY STORAGE UNIT

CROSS REFERENCE

This application is the Continuation application of U.S. application Ser. No. 15/622,306 filed on Jun. 14, 2017, which is the Continuation application of International Application No. PCT/JP2015/005494 filed on Nov. 2, 2015, which claims the benefit of Japanese Application No. 2015-002002 filed on Jan. 8, 2015, the entire contents of each are hereby incorporated by reference.

TECHNICAL FIELD

The present disclosure relates to an electricity storage unit used for various electronic devices, an electric device, an industrial device, an automobile, and the like.

BACKGROUND

As an example of an electricity storage device, an electric double layer capacitor has been developed as an electricity storage device for power assistance, backup, or the like of an electronic device. In the development of the electricity storage device, an electricity storage unit made by combining a plurality of capacitors has been considered.

FIG. 13 is a perspective view illustrating a conventional capacitor module as an example of a conventional electricity storage unit. The conventional capacitor module has lower case 101, upper case 102, connector 103, and screw 104. Lower case 101 and upper case 102 house a plurality of capacitors and a control board electrically connected with these capacitors (both are not shown) so as to hold the capacitors and the control board from above and below. Connector 103 is exposed to outside from lower case 101 and upper case 102. Screw 104 fixes upper case 102 to lower case 101 at each end parts of lower case 10 land upper case 102.

It is noted that, for example, Unexamined Japanese Patent Publication No. 2009-253009 1 is known as a prior art document regarding the present application.

SUMMARY

An electricity storage unit of the present disclosure includes: an electricity storage device; a holder for holding this electricity storage device; a case having a tubular side wall part and a bottom surface part closing one end of the side wall part, the case being formed with an opening at another end of the side wall part; and a cover for covering the opening. The electricity storage device and the holder are housed inside the case. At least a part of the cover is inserted inside the case. An aperture is formed at least part of a region between an outer periphery of the cover and an inner surface of the side wall part.

With this configuration, the electricity storage unit of the present disclosure suppresses intrusion of a foreign substance into the case and improves reliability. This is because a surface on which a joint between the case and the cover is formed can be disposed only on one side (an opening side of the case) with this configuration. As a result, it is possible to restrict an entrance into which a foreign substance (particularly, a water droplet) intrudes.

DESCRIPTION OF EMBODIMENTS

Prior to description of an exemplary embodiment of the present disclosure, problems of a conventional electricity storage unit are described.

By using the cases of the electricity storage unit described above, the electricity storage unit can obtain airtightness to some extent, so that intrusion of a foreign substance into the cases can be suppressed. However, further consideration has been required to prevent intrusion of a water droplet from the outside to the inside of the cases.

Therefore, the present disclosure provides an electricity storage unit capable of easily preventing intrusion of a water droplet.

An exemplary embodiment of the present disclosure is described below with reference to the drawings. However, a configuration of the present disclosure is not limited to the following content.

Figure 1:
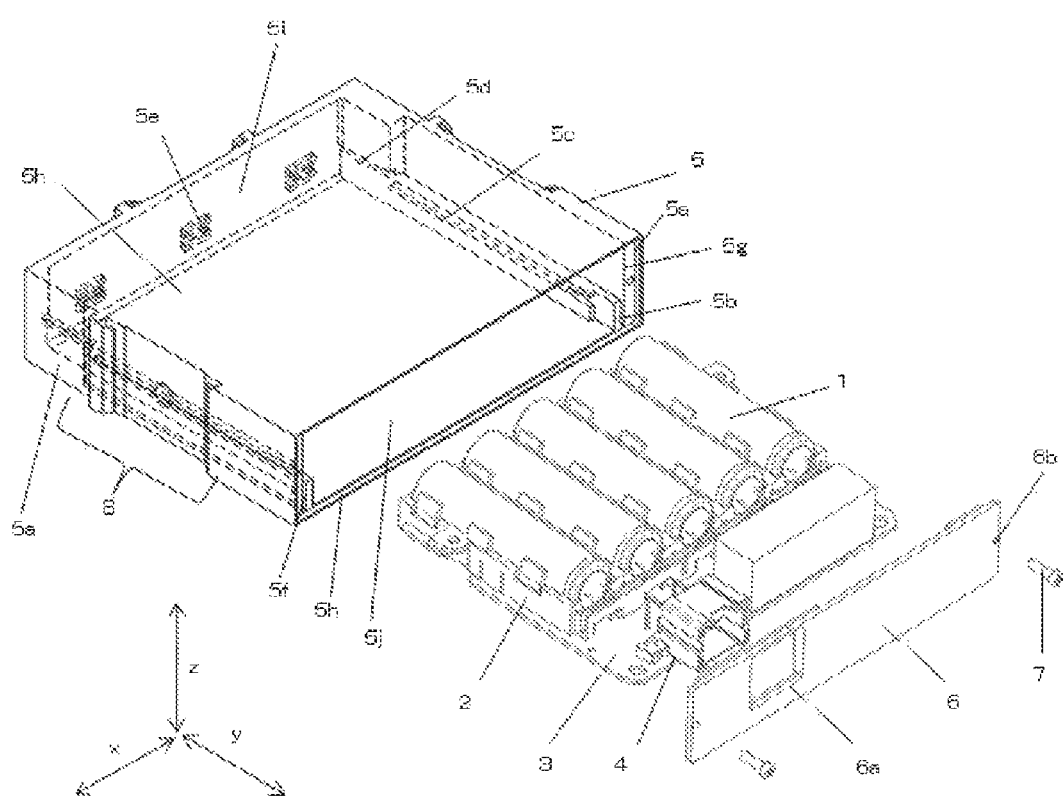
FIG. 1 is an exploded perspective view illustrating an electricity storage unit in an exemplary embodiment of the present disclosure.
Figure 2:
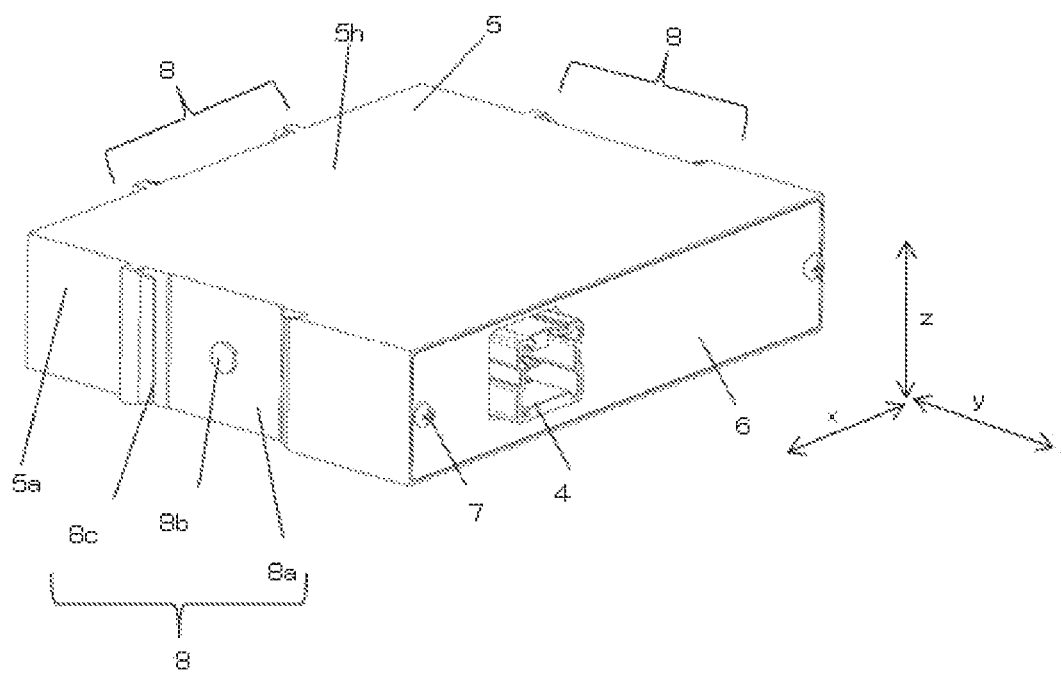
FIG. 2 is an external perspective view illustrating the electricity storage unit in the exemplary embodiment of the present disclosure.

FIG. 1 is an exploded perspective view illustrating an electricity storage unit in a present exemplary embodiment. FIG. 2 is an external perspective view illustrating the electricity storage unit in the present exemplary embodiment.

As shown in FIGS. 1, 2, the electricity storage unit in the present exemplary embodiment is configured with a plurality of electricity storage devices 1, holder 2, control board 3, connector 4, bottomed tubular case 5, and cover 6. Electricity storage devices 1 perform charging and discharging, and holder 2 holds these electricity storage devices 1. Control board 3 is electrically connected with electricity storage devices 1 and is held by holder 2. Connector 4 is electrically connected with electricity storage devices 1 by being electrically connected with this control board 3. Case 5 houses electricity storage devices 1, holder 2, control board 3, and connector 4 described above, and cover 6 seals case 5. Here, connector 4 is one example of an "external connection terminal" in the present disclosure.

A side wall part of case 5 has a tubular shape with a rectangular cross section. The side wall part has side walls 5a that face each other in a horizontal direction (x direction in FIGS. 1, 2) and side walls 5h that face each other in a vertical direction (z direction in FIGS. 1, 2). Further, case 5 has bottom surface part 5i that closes an end on one side (a rear side) in y direction of the side wall part (side walls 5a, 5h) (see FIG. 1), and opening 5j is formed at an end on the other side (a front side) in y direction of the side wall part. Electricity storage device 1, holder 2, control board 3, and connector 4 are inserted from the front side (opening 5j side) of case 5 toward the rear side (bottom surface part 5i side) of case 5 in y direction in FIGS. 1, 2. Here, the direction in which bottom surface part 5i and opening 5j face each other (y direction in FIGS. 1, 2) is one example of a "first direction" in the present disclosure.

Figure 3A:
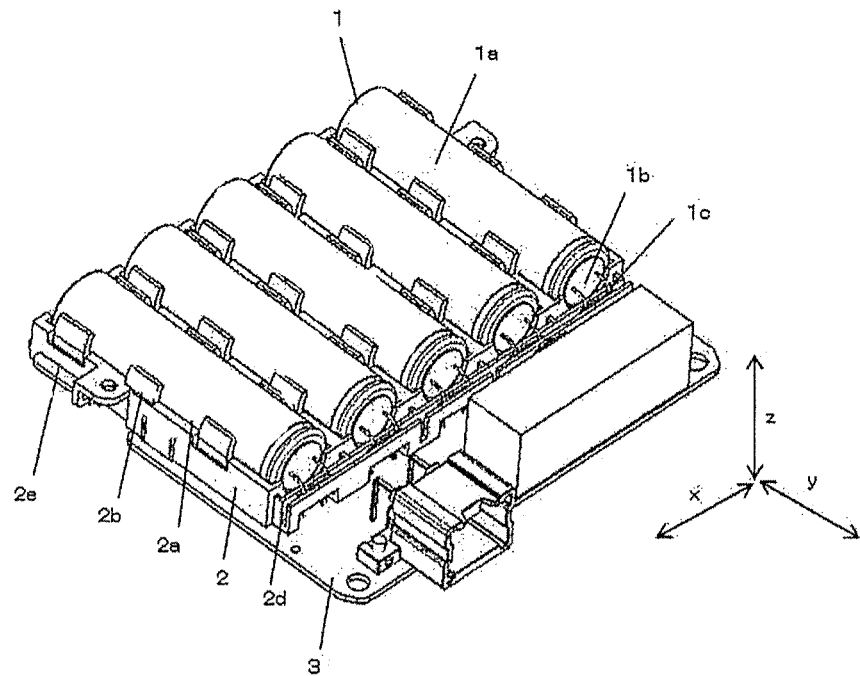
FIG. 3A is a perspective view seen from above illustrating electricity storage devices, a holder, a control board, and a connector in the exemplary embodiment of the present disclosure.
Figure 3B:
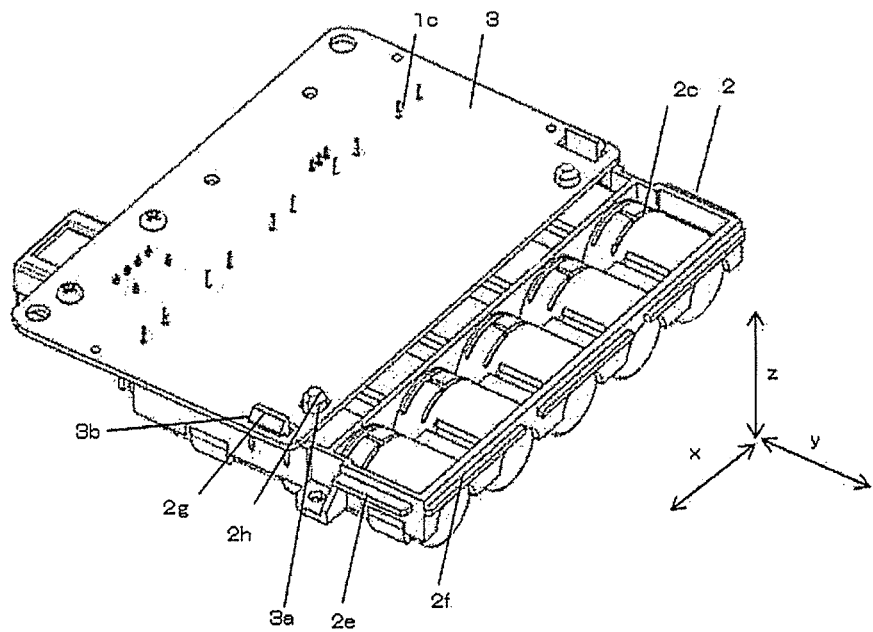
FIG. 3B is a perspective view seen from below illustrating electricity storage devices, a holder, a control board, and a connector in the exemplary embodiment of the present disclosure.

FIG. 3A is a perspective view seen from above illustrating electricity storage devices 1, holder 2, control board 3, and connector 4 in the present exemplary embodiment. FIG. 3B is a perspective view seen from below illustrating electricity storage devices 1, holder 2, control board 3, and connector 4 in the present exemplary embodiment.

Electricity storage device 1 is configured with, for example, an electric double layer capacitor. As shown in FIGS. 1, 3A, 3B, electricity storage device 1 in the present exemplary embodiment includes bottomed cylindrical outer container 1a, sealing member 1b, and a pair of external terminals 1c. Outer container 1a contains an electricity storage element and an electrolytic solution (both are not shown). Sealing member 1b seals an opening of outer container 1a. External terminal 1c having a liner shape extends from a through-hole (not shown) provided at sealing member 1b to outside. External terminals 1c are made of a conductive material, and electrically connected with a pair of electrodes of the electricity storage element inside outer container 1a, respectively. Further, outer container 1a is made of, for example, metal, and sealing member 1b is made of, for example, rubber. In the following description, a direction from a bottom surface of outer container 1a toward sealing member 1b (y direction in FIGS. 1, 3) is defined as a height direction of electricity storage device 1.

Holder 2 is made of an insulating material. In the present exemplary embodiment, this holder 2 has a plurality of housing chambers 2a, tongue-shaped fixing pawl 2b, and tongue-shaped fixing pawl 2c. The plurality of housing chambers 2a house the plurality of (five) electricity storage devices 1, respectively. Tongue-shaped fixing pawl 2b extends from an opening end of housing chamber 2a. Tongue-shaped fixing pawl 2c is formed at a bottom of above-described housing chamber 2a. Three pairs of fixing pawls 2b are formed on both sides of each housing chamber 2a. Further, fixing pawl 2c is formed by forming a U-shaped slit hole at the bottom of housing chamber 2a. Fixing pawls 2b, 2c respectively abut on and press a cylindrical peripheral side surface of outer container 1a so as to hold a side surface of outer container 1a of electricity storage device 1. With this configuration, electricity storage device 1 is held by holder 2. The plurality of housing chambers 2a are disposed side by side so that the respective height directions of the plurality of housed electricity storage devices 1 are parallel to each other.

In control board 3, wiring (not shown) is formed on a plane surface of a plate made of a resin base material. By electrically connecting external terminals 1c of the plurality of above-described electricity storage devices 1 with this wiring, the plurality of electricity storage devices 1 can be connected in series or in parallel.

Holder 2 is fixed to the plane surface, on which the above-described wiring is formed, of control board 3. Control board 3 and a back surface of above-described holder 2 partially face each other, the back surface being disposed at back side of a surface on which above-described housing chambers 2a are formed. Board supporting parts 2g, 2h are formed on the surface of above-described holder 2, which faces control board 3. Board supporting part 2h is a boss, and performs positioning of holder 2 with respect to control board 3 by inserting board supporting part 2h into guide hole 3a formed on control board 3. Board supporting part 2g is a snap fit, and fixes holder 2 to control board 3 by inserting board supporting part 2g into fixing hole 3b formed on control board 3. In the present exemplary embodiment, holder 2 and control board 3 face in a shifted manner so as to protrude from each other in an opposite direction (y direction in FIGS. 3A, 3B). With reference to FIG. 1, the protruding direction is a direction identical to (a direction parallel to) a direction from bottom surface part 5i toward opening 5j of case 5 (a direction that cover 6 faces to bottom surface part 5i).

Above-described electricity storage device 1 is housed in housing chamber 2a so that an opening surface of this housing chamber 2a is parallel to the height direction of electricity storage device 1. Linear external terminal 1c extends from above-described holder 2 in the height direction (y direction in FIGS. 3A, 3B). Then, external terminal 1c is bent toward the plane surface of control board 3 in z direction at a bending part provided midway. After that, external terminal 1c is electrically connected to the wiring formed on the plane surface of control board 3. In the present exemplary embodiment, a part of external terminal 1c which extends toward control board 3 in z direction is held by terminal supporting part 2d provided in holder 2. With this configuration, a stress applied to a connecting portion between external terminal 1c and control board 3, which is caused by an external stress, can be reduced.

Figure 4:
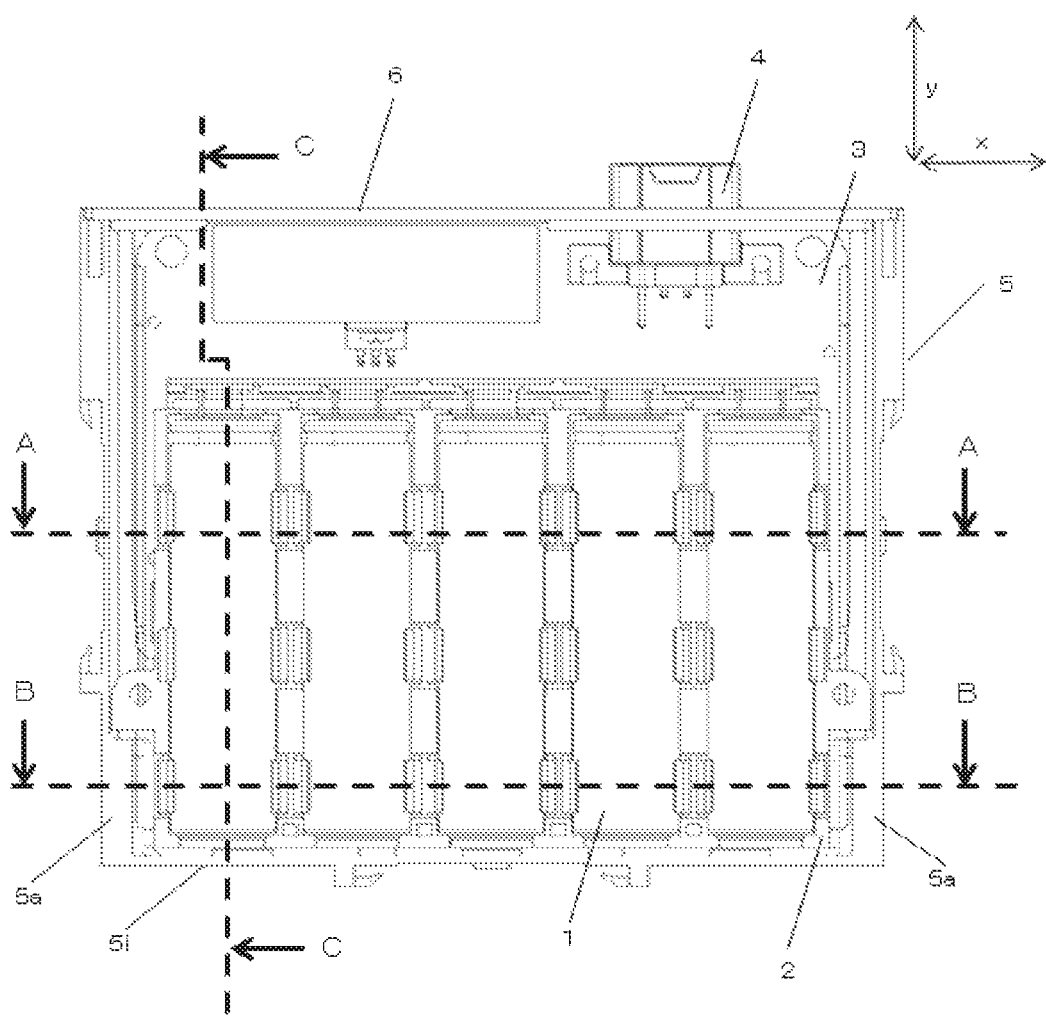
FIG. 4 is a plan view illustrating the electricity storage unit in the exemplary embodiment of the present disclosure from which a part of a side wall of a case is excluded.
Figure 5:
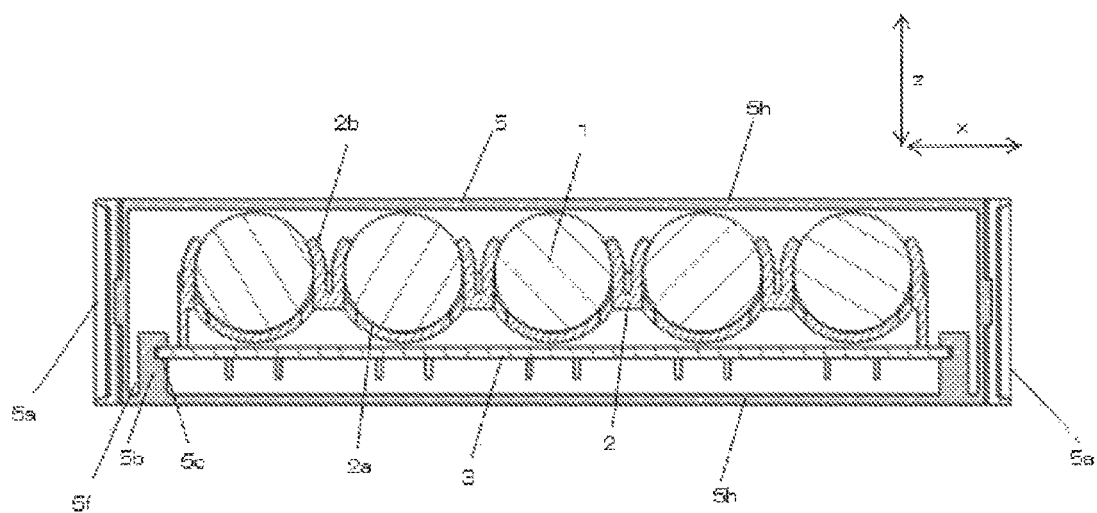
FIG. 5 is a sectional view illustrating the electricity storage unit in the exemplary embodiment of the present disclosure cut along cutting line AA in FIG. 4.
Figure 6:
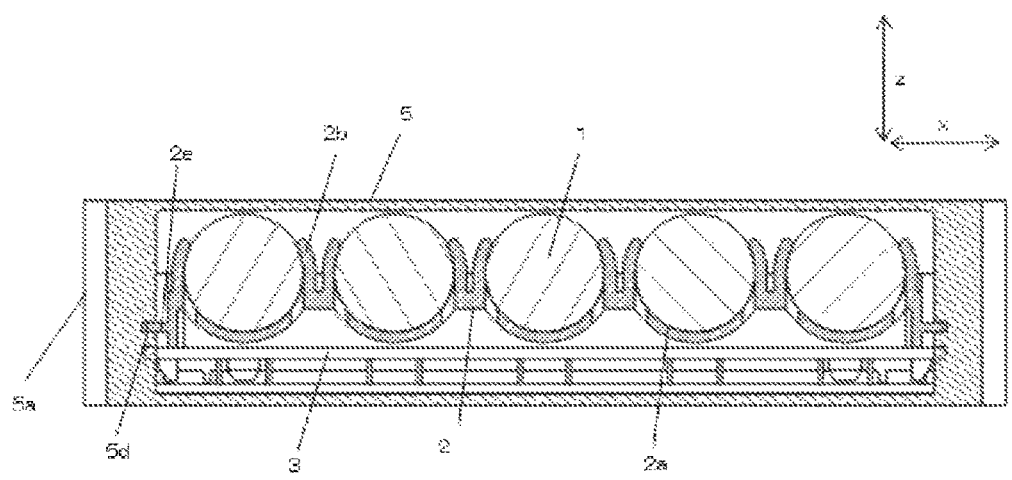
FIG. 6 is a sectional view illustrating the electricity storage unit in the exemplary embodiment of the present disclosure cut along cutting line BB in FIG. 4.
Figure 7:
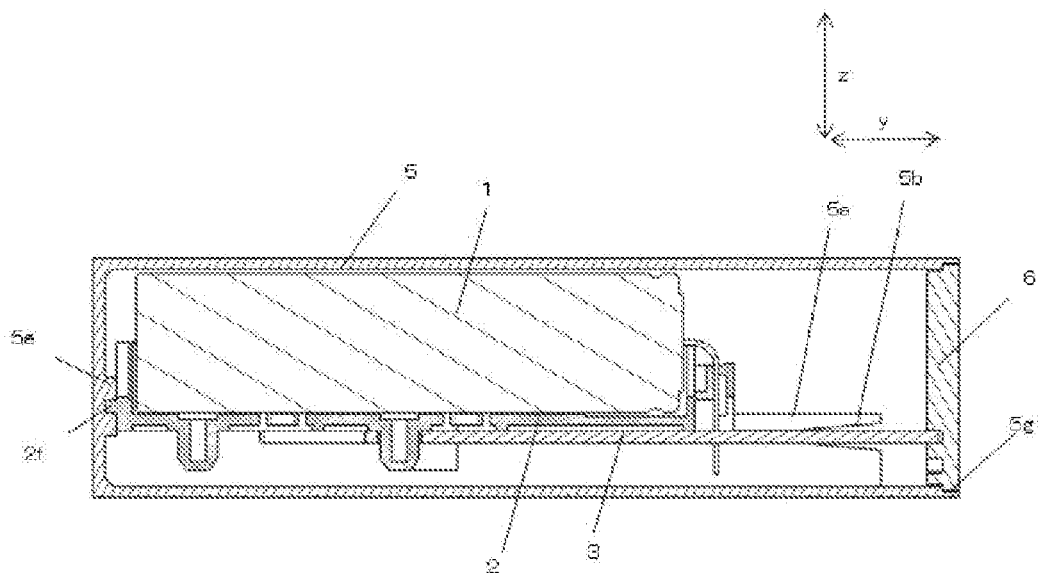
FIG. 7 is a sectional view illustrating the electricity storage unit in the exemplary embodiment of the present disclosure cut along stepped cutting line CC in FIG. 4.
Figure 8:
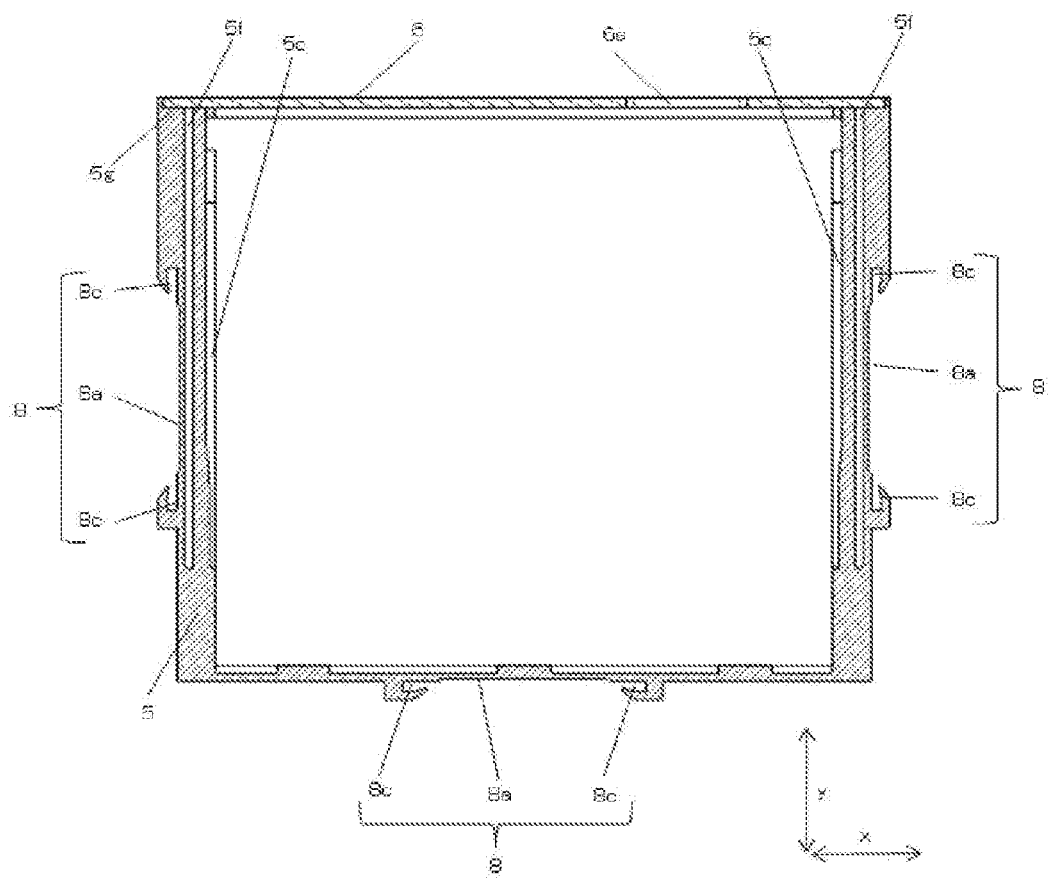
FIG. 8 is a plan sectional view illustrating the case and a cover used in the electricity storage unit in the exemplary embodiment of the present disclosure.

FIG. 4 is a plan view illustrating the members housed in case 5 while illustration of side wall 5h on an upper surface side of case 5 (see FIGS. 1, 2) is omitted in the electricity storage unit in the present exemplary embodiment. FIG. 5 is a sectional view illustrating the electricity storage unit in the present exemplary embodiment cut along cutting line AA in FIG. 4. FIG. 6 is a sectional view illustrating the electricity storage unit in the present exemplary embodiment cut along cutting line BB in FIG. 4. FIG. 7 is a sectional view illustrating the electricity storage unit in the present exemplary embodiment cut along stepped cutting line CC in FIG. 4. FIG. 8 is a plan sectional view illustrating case 5 and cover 6 cut in the horizontal direction.

As shown in FIGS. 5, 6, housing chamber 2a of holder 2 that houses electricity storage device 1 is constituted by a recess having a substantially semicylindrical space.

Case 5 is made of an insulating material. In case 5 of the present exemplary embodiment, an area of side wall 5h is larger than an area of side wall 5a, and an edge of a rectangular shape, which configures opening 5j of case 5, is long.

A plurality of fixing means for supporting holder 2 or control board 3 are provided inside case 5. As shown in FIGS. 1, 5, control board 3 of the present exemplary embodiment is housed in case 5 so that the plane surface of control board 3 is parallel to side wall 5h.

As shown in FIGS. 1, 5, 8, in case 5 of the present exemplary embodiment, guide wall 5b parallel to side wall 5a is erected on an inner surface of side wall 5h at a lower surface side. A pair of guide walls 5b is provided, and each of guide walls 5b is parallel to side wall 5a. Linear guide grooves 5c are formed on respective surfaces of this pair of guide walls 5b which face each other. At this time, a forming direction of guide groove 5c is the direction from bottom surface part 5i toward opening 5j of case 5 (y direction in FIG. 1). Here, guide groove 5c is one example of a "first groove" in the present disclosure. Both edges of control board 3 are housed (inserted) into guide grooves 5c, and a position of control board 3 inside case 5 is determined.

As shown in FIGS. 1, 6, case 5 has guide groove 5d at a position closer to bottom surface part 5i of case 5 than guide groove 5c. Here, guide groove 5d is one example of a "second groove" in the present disclosure. A tip of flange 2e (see FIGS. 3A, 3B) formed on a side surface of holder 2 is inserted into this guide groove 5d. Here, flange 2e is one example of a "side end" in the present disclosure. Further, as shown in FIGS. 1, 7, recess 5e is formed inside of bottom surface part 5i of case 5. This recess 5e holds flange 2f formed at a rear end of holder 2 which faces bottom surface part 5i of case 5. Here, flange 2f is one example of a "protrusion" in the present disclosure. In this way, holder 2 is fixed to side wall 5h and bottom surface part 5i by flanges 2e and 2f.

It should be noted that, by reducing a groove depth of guide groove 5c from opening 5j toward bottom surface part 5i of case 5, a stress applied to both ends of control board 3 can be increased as control board 3 approaches toward bottom surface part 5i. With this configuration, control board 3 can be also fixed by guide groove 5c inside case 5. Accordingly, integrated holder 2 and control board 3 can be fixed against stresses from three axes. In this case, since holder 2 and control board 3 can be fixed inside case 5 without pressing control board 3 by cover 6, a load on the connecting portion between external terminal 1c and control board 3 can be reduced.

Moreover, in order to reduce the load on the connecting portion between external terminal 1c and control board 3, fixing strength between board supporting part 2h and control board 3 is higher than a stress required for fitting recess 5e and flange 2f. With this configuration, when recess 5e and flange 2f are fitted and fixed, a stress applied to control board 3 from holder 2 can be suppressed. An example of means for adjusting the stress required for the fitting and the fixing strength between board supporting part 2h and control board 3 described above includes adjustment of a gap dimension between two members fixed to each other. In case of the present exemplary embodiment, with reference to FIG. 3B, it is configured that a gap dimension between guide hole 3a of control board 3 and board supporting part 2h to be inserted is smaller than a gap dimension between flange 2f and recess 5e.

Further, it is preferable that guide grooves 5c, 5d are parallel to each other and not located on a same plane. In other words, it is preferable that guide grooves 5c, 5d be located on different planes in z direction with reference to FIGS. 5, 6. This is because integrated holder 2 and control board 3 can be fixed more tightly against the stress in the vertical direction (the direction in which side walls 5h face each other).

Moreover, holder 2 and control board 3 are fixed against the stresses in the different directions as described above. Accordingly, when an individual dimension error occurs to control board 3 or holder 2, a positional relation between holder 2 and control board 3 is corrected, and application of the load on the connecting portion between external terminal 1c and control board 3 can be suppressed.

Cover 6 is made of an insulating material. Further, as shown in FIGS. 1, 7, 8, cover 6 in the present exemplary embodiment is housed in stepped cover housing 5g provided on case 5 at opening 5j side. Cover 6 is fixed to case 5 by engaging screw 7 with a screw hole provided at cover housing 5g. Further, control board 3 can be fixed to cover 6 by a screw or the like (not shown).

At this time, in the electricity storage unit of the present disclosure, since cover 6 is entirely inserted (housed) into opening 5j of case 5, a boundary (joint) between cover 6 and case 5 appears only at opening 5j side in case 5, and does not appear at the side wall part (side walls 5a, 5h) side in case 5. With this configuration, a foreign substance cannot intrude from outside to inside of case 5 in a direction other than a direction in which cover 6 faces bottom surface part 5i of case 5 (y direction). In this case, a possibility that the foreign substance, such as a water droplet, will intrude from the above-described boundary can be greatly reduced by directing opening 5j of this case 5 downward. In the present disclosure, it is not necessary that cover 6 is entirely housed inside of case 5. Cover 6 may be partially housed inside of case 5. Further, through-hole 6a is provided in cover 6 of the present exemplary embodiment, and connector 4 is exposed to outside of case 5 through this through-hole 6a. With this configuration, the boundary (the joint) between connector 4 and cover 6 can be also formed at opening 5j side in case 5. Accordingly, the electricity storage unit is more reliable and can suppress intrusion of the foreign substance to the inside of case 5.

Further, as shown in FIGS. 1, 2, 4 or the like, fixing tool connection part 8 is provided on outer surfaces of side walls 5a (the side wall part) and bottom surface part 5i. Fixing tool connection part 8 has fitting surface 8a and a pair of holding parts 8c. Protrusion 8b is formed in a center of fitting surface 8a, and the pair of holding parts 8c is formed along a pair of side end edges of this fitting surface 8a which faces each other (in z direction in FIGS. 1, 2, 4). Here, holding part 8c is one example of a "third groove" in the present disclosure.

Figure 9:
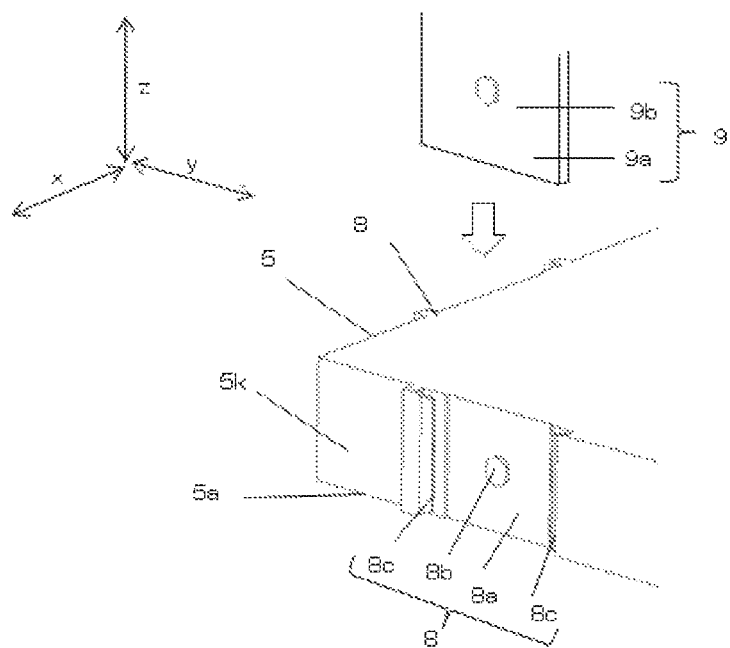
FIG. 9 is a schematic view illustrating a method for fixing the electricity storage unit in the exemplary embodiment of the present disclosure to another member.

FIG. 9 is a schematic view illustrating a method for fixing the electricity storage unit in the present exemplary embodiment to another member. The method for fixing the electricity storage unit to the other member is described with reference to FIG. 9. Since fixing tool connection part 8 has the above-described configuration, fixing tool 9 having a flat portion as shown in FIG. 9 can be used. In other words, fixing tool 9 has a connection surface 9a formed with supporting hole 9b in a center. A width in y direction of this connection surface 9a is substantially equal to an interval between the pair of holding parts 8c, and a thickness of fixing tool 9 in x direction of connection surface 9a is substantially equal to a holding width (a groove width) of holding part 8c. In this case, fixing tool 9 can be inserted between holding parts 8c from above while connection surface 9a is slid on fitting surface 8a, as shown by an arrow in FIG. 9. Accordingly, connection surface 9a can be easily held by fitting surface 8a and holding parts 8c. Here, protrusion 8b is formed on fitting surface 8a, and supporting hole 9b is formed on connection surface 9a. Accordingly, when connection surface 9a is inserted into fixing tool connection part 8, at least one of connection surface 9a and fitting surface 8a is elastically deformed. However, connection surface 9a or fitting surface 8a subjected to the above-described elastic deformation is returned to an original shape by accommodating protrusion 8b in supporting hole 9b. With this configuration, since connection surface 9a hardly comes off from fixing tool connection part 8, fixing tool 9 can be fixed to fixing tool connection part 8 more tightly.

Here, in the electricity storage unit of the present exemplary embodiment, gap 5f is provided between side wall 5a and guide wall 5b on which guide groove 5c is formed. Further, guide groove 5d is formed at a position closer to bottom surface part 5i than an inner surface of side walls 5a which faces fixing tool connection part 8. With these configurations, even in a case where the both edges of control board 3 and flanges 2e of holder 2 are respectively inserted into guide grooves 5c and guide grooves 5d, fitting surface 8a on which protrusion 8b is formed can be easily subjected to the elastic deformation described above. Moreover, when fitting surface 8a is subjected to the elastic deformation, the both edges of control board 3 and flanges 2e of holder 2 are not further pressed in the horizontal direction. Accordingly, breakage of control board 3 and holder 2 can be suppressed.

In this case, it is preferable that a region where fitting surface 8a is formed is made to be thinner than other region in side walls 5a and bottom surface part 5i. With this configuration, since fitting surface 8a is easily bent, connection surface 9a can be easily inserted into fixing tool connection part 8. Further, in the present exemplary embodiment, since both ends of holding part 8c in the vertical direction (z direction) are opened, fixing tool 9 can be fitted from both upper and lower directions. This electricity storage unit can enhance a degree of freedom of mounting a device to be mounted.

In the present exemplary embodiment, guide groove 5c is formed on guide wall 5b. However, a configuration of the present disclosure is not limited to this. Guide groove 5c may be directly formed on the inner surface of side wall 5a having a constant thickness. In other words, it is possible to form guide grooves 5c on a pair of surfaces face each other inside case 5. However, since gap 5f can be easily formed as described above, the configuration of providing gap 5f on guide wall 5b is more preferable from a viewpoint of providing fixing tool connection part 8.

Next, configurations of electricity storage units in other exemplary embodiments of the present disclosure are described. It should be noted that same reference marks are assigned to configurations identical to the configuration of the electricity storage unit in the above-described exemplary embodiment, and description of the configurations is omitted.

Figure 10:
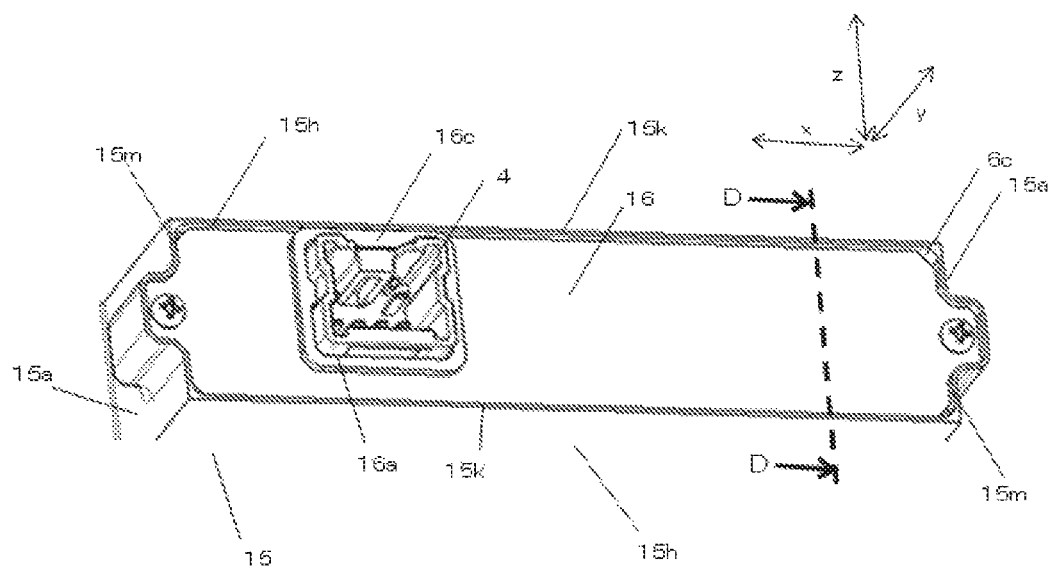
FIG. 10 is a partial perspective view illustrating vicinity of an opening of a case and a cover in an electricity storage unit in another exemplary embodiment of the present disclosure.
Figure 11:
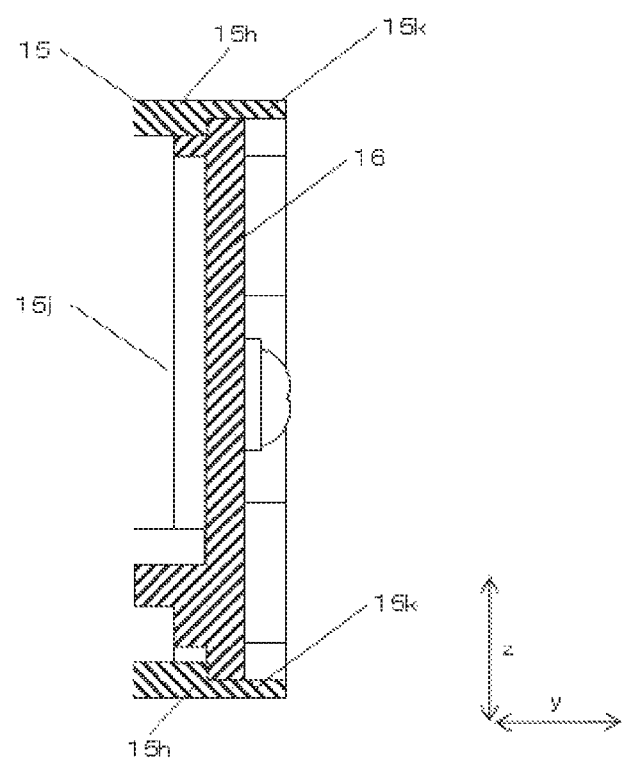
FIG. 11 is a partial sectional view on an opening side illustrating the electricity storage unit in the other exemplary embodiment of the present disclosure cut along cutting line DD in FIG. 10.

FIG. 10 is a partial perspective view illustrating vicinity of opening 15j of case 15 and cover 16 in an electricity storage unit in another exemplary embodiment of the present disclosure. FIG. 11 is a partial sectional view on opening 15j side illustrating the electricity storage unit in the other exemplary embodiment of the present disclosure cut along cutting line DD in FIG. 10.

As shown in FIGS. 10, 11, in the electricity storage unit in the other exemplary embodiment of the present disclosure, cover 16 is housed inside opening 15j of case 15. With this configuration, appentices 15k, 15m that protrude outward from cover 16 are formed at ends of side walls 15a and 15h on opening 15j side. With this configuration, a joint between cover 16 and case 15 can be disposed inside of case 15 by appentices 15k, 15m. Accordingly, for example, even in a case where a water droplet flows toward opening 15j along side wall 15a or 15h, intrusion of the water droplet into case 15 can be suppressed. Further, it is possible to apply an IPx1 waterproofing standard to the electricity storage unit in the other exemplary embodiment of the present disclosure. At this time, lengths of appentices 15k, 15m are 10 mm or less, preferably about 4 mm.

Further, in the electricity storage unit in the other exemplary embodiment of the present disclosure, raised part 16c is provided around through-hole 16a on an outer surface of cover 16. With this configuration, in a case where the water droplet flows along the outer surface of cover 16, intrusion of the water droplet into case 15 from through-hole 16a can be suppressed.

Figure 12:
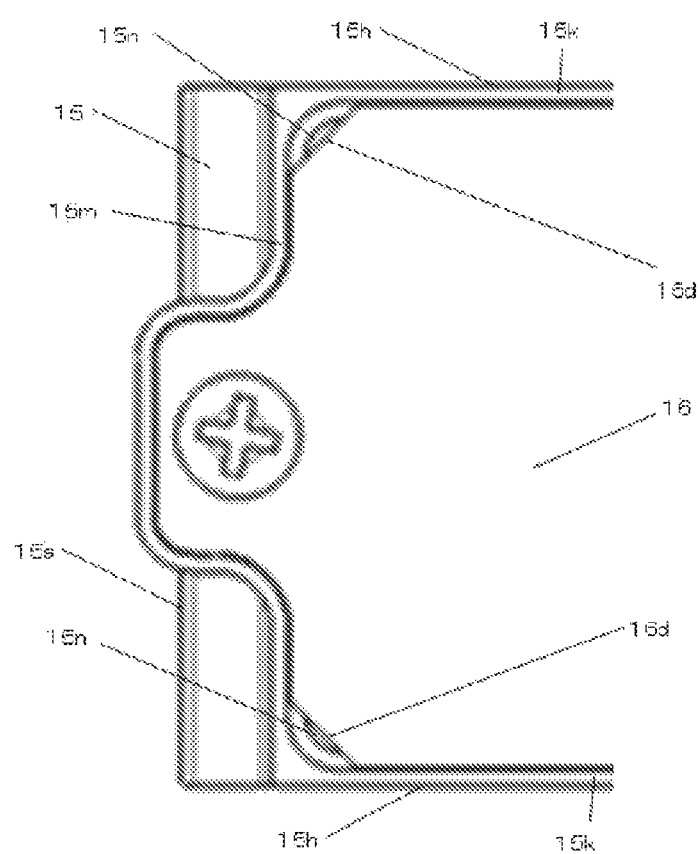
FIG. 12 is a partial front view illustrating an electricity storage unit in another exemplary embodiment of the present disclosure.
Figure 13:
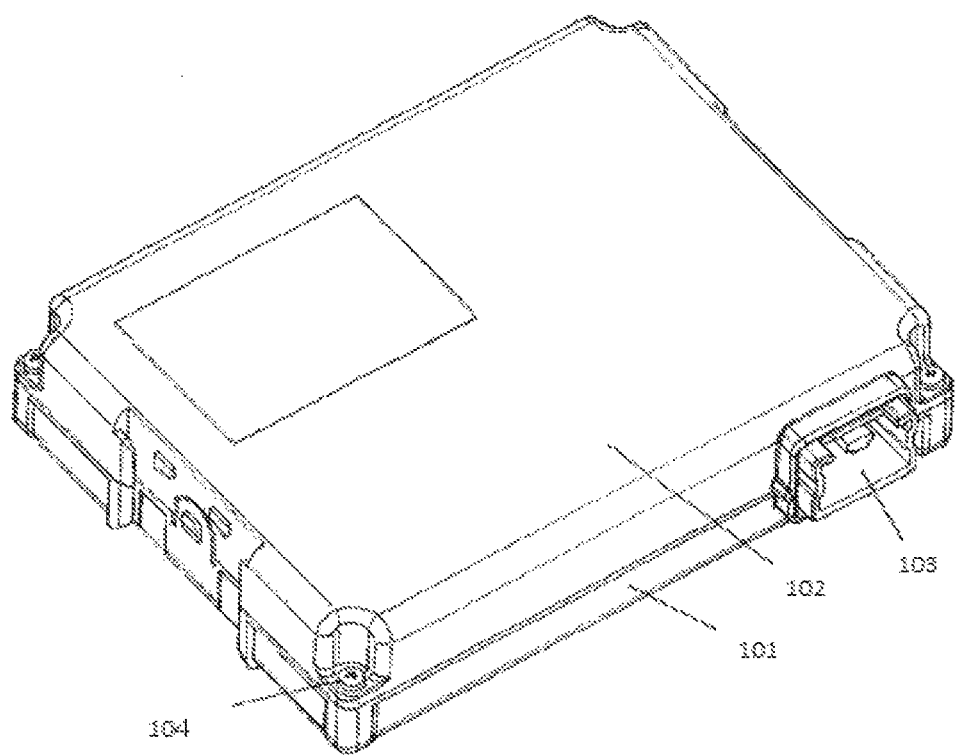
FIG. 13 is an external perspective view illustrating a conventional electricity storage unit.

Further, FIG. 12 is a partial front view illustrating an electricity storage unit in another exemplary embodiment of the present disclosure. As shown in FIG. 12, aperture 15n is formed between cover 16 and an inner surface of a side wall part (side walls 15a, 15h) of case 15 by forming a cutout 16d at a part of an end edge of cover 16. With this configuration, even in a case where a water droplet or the like intrudes into case 15, the water droplet can be discharged from aperture 15n. Accordingly, accumulation of water inside case 15 can be suppressed. As described above, aperture 15n can function as a discharge hole. However, when a large opening beyond necessity is formed, an unnecessary foreign substance easily intrudes from the opening. Because of this, a maximum opening width of aperture 15n can be 10 mm or less (for example, about 2 mm). A shape of the aperture can be appropriately selected, and the aperture can have a substantially circular shape, a substantially triangular shape, or the like. Further, when aperture 15n is formed, a through-hole may be formed in cover 16 instead of cutting out a part of cover 16, as mentioned above. Further, it is preferable that aperture 15n is formed at a position along the inner surface of the side wall part (side walls 15a, 15h) of case 15. However, in a case where case 15 has a rectangular tubular shape, in particular, it is preferable that aperture 15n is provided at a corner of side wall 15a and side wall 15h of case 15.

The electricity storage unit of the present disclosure can reduce a boundary (joint) between a case and a cover appeared on an outer surface of the case, thus suppressing intrusion of a foreign substance into the case. This can suppress a failure of the electricity storage unit caused by the intrusion of the foreign substance. Because of this, the electricity storage unit is expected to be used as an electricity storage device of an electronic apparatus used in various environments and requiring high reliability.

What is claimed is:
1. An electricity storage unit comprising:
    an electricity storage device;
    a holder for holding the electricity storage device;
    a case having a tubular side wall part and a bottom surface part closing one end of the side wall part, the case being formed with an opening at another end of the side wall part; and
    a cover for covering the opening, wherein:
    the electricity storage device and the holder are housed inside the case,
    at least a part of the cover is inserted inside the case, and
    an aperture is formed at least part of a region between an outer periphery of the cover and an inner surface of the side wall part.

2. The electricity storage unit according to claim 1, wherein:
the cover has a cutout, and
the aperture is formed between the cutout and the inner surface of the side wall part.

3. An electricity storage unit comprising:
an electricity storage device;
a holder for holding the electricity storage device;
a case having a tubular side wall part and a bottom surface part closing one end of the side wall part, the case being formed with an opening at another end of the side wall part;
a cover for covering the opening;
a control board that is formed with a wiring electrically connected with the electricity storage device; and
an external connection terminal that is electrically connected with the control board, wherein:
the electricity storage device and the holder are housed inside the case,
the cover has a through-hole,
the external connection terminal is exposed to outside of the case through the through-hole, and
the cover has a raised part provided around the through-hole on an outer surface of the cover.

4. The electricity storage unit according to claim 3, wherein the raised part surrounds the through-hole.

5. The electricity storage unit according to claim 3, wherein an inner surface of the raised part surrounding the through-hole is flush with an inner surface of the through-hole.

6. The electricity storage unit according to claim 3, wherein the external connection terminal is in contact with the raised part.

7. An electricity storage unit comprising:
an electricity storage device; and
a holder for holding the electricity storage device, wherein:
the electricity storage unit includes a fixing tool connection part provided on at least a part of the side wall part and the bottom surface part of the electricity storage unit, and
the fixing tool connection part has a fitting surface on which a protrusion is formed, and a pair of third grooves formed along a pair of side end edges of the fitting surface which faces each other.

8. The electricity storage unit according to claim 7, further comprising a case having a side wall part and a bottom surface part closing one end of the side wall part, the case being formed with an opening at another end of the side wall part, wherein:
a guide wall extending in a direction in which the bottom surface part and the opening face each other is provided in the case, and
a gap is provided between the guide wall and an inner surface of the case, the inner surface of the case being opposite to the fitting surface.

9. The electricity storage unit according to claim 8, further comprising a control board that is formed with a wiring electrically connected with the electricity storage device, wherein:
a first groove that extends in the direction in which the bottom surface part and the opening face each other is formed on the guide wall, a part of side end edge of the control board being inserted into the first groove.

10. The electricity storage unit according to claim 9, wherein a second groove that extends in the direction in which the bottom surface part and the opening face each other is formed on the guide wall, a part of side end edge of the holder being inserted into the second groove.

11. The electricity storage unit according to claim 8, further comprising a cover for covering the opening, wherein:
the electricity storage device and the holder are housed inside the case,
at least a part of the cover is inserted inside the case, and
an aperture is formed at least part of a region between an outer periphery of the cover and an inner surface of the side wall part.

12. The electricity storage unit according to claim 11, wherein:
the cover has a cutout, and
the aperture is formed between the cutout and the inner surface of the side wall part.

13. An electricity storage module comprising:
the electricity storage unit according to claim 7; and
a fixing tool, wherein:
the fixing tool has a supporting hole;
the fixing tool is supported on the fitting surface by fitting the protrusion into the supporting hole and by being inserted to the pair of third grooves to be held with a pair of holding parts and the fitting surface, the pair of holding parts constituting the pair of third grooves.

14. The electricity storage module according to claim 13, wherein the fixing tool is supported on the fitting surface by being pressed by the pair of holding parts.

15. The electricity storage module according to claim 14, wherein:
the pair of holding parts includes a pair of tip portions each extending in a direction facing to each other, each of the pair of tip portions having a shape whose thickness gradually decrease toward a tip end of the each of the pair of tip portions, and
the fixing tool is supported on the fitting surface by being in contact with the pair of tip portions.

16. An electricity storage unit comprising:
an electricity storage device;
a holder for holding the electricity storage device;
a case having a tubular side wall part and a bottom surface part closing one end of the side wall part, the case being formed with an opening at another end of the side wall part;
a control board that is formed with a wiring electrically connected with the electricity storage device; and
a cover for covering the opening, wherein:
the electricity storage device and the holder are housed inside the case,
the holder is fixed to the control board,
a rear end of the holder is supported inside the case by abutting the rear end to an inner surface of the bottom surface part, the rear end facing the bottom surface part,
a recess for holding a protrusion is provided on the inner surface of the bottom surface part, the protrusion being provided at the rear end of the holder, and
fixing strength between the holder and the control board is greater than fixing strength between the recess and the protrusion.

17. The electricity storage unit according to claim 16, further comprising an external connection terminal that is electrically connected with the control board, wherein:
the cover has a through-hole,
the external connection terminal is exposed to outside of the case through the through-hole, and
the cover has a raised part provided around the through-hole on an outer surface of the cover.

18. An electricity storage unit comprising:
an electricity storage device;
a holder for holding the electricity storage device;
a case having a tubular side wall part and a bottom surface part closing one end of the side wall part; and
a control board that is formed with a wiring electrically connected with the electricity storage device, wherein:
the electricity storage device and the holder are housed inside the case,
the holder is fixed to the control board,
the holder is fixed to the case,
fixing strength between the holder and the control board is greater than fixing strength between the holder and the case.

19. The electricity storage unit according to claim 18, wherein:
the case being formed with an opening at another end of the side wall part,
in the case, the control board is housed so as to be parallel to a first direction in which the bottom surface part and the opening face each other, and
the control board is supported inside the case by abutting each of a pair of side end edges of the control board to an inner surface of the side wall part, the pair of side end edges of the control board facing each other.

20. The electricity storage unit according to claim 19, wherein the holder is supported inside the case by abutting a rear end of the holder to an inner surface of the bottom surface part, the rear end of the holder facing the bottom surface part.

* * * * *